United States Patent [19]

Rauscher et al.

[11] Patent Number: 5,191,249

[45] Date of Patent: Mar. 2, 1993

[54] SELF-ALIGNING BEARING FOR A PRECISION MEASUREMENT PENDULUM

[75] Inventors: Erich Rauscher, Munich; Hans D. Jacoby, Vaterstetten; Karel Srb, Munich, all of Fed. Rep. of Germany

[73] Assignee: Arnold & Richier Cine Technik, GmbH & Co. Betriebs KG, Munich, Fed. Rep. of Germany

[21] Appl. No.: 756,867

[22] Filed: Sep. 9, 1991

[30] Foreign Application Priority Data

Sep. 8, 1990 [DE] Fed. Rep. of Germany ....... 4028858

[51] Int. Cl.[5] .......................... H02K 7/09; G01H 1/00
[52] U.S. Cl. ....................................... 310/90.5; 73/653
[58] Field of Search .......... 310/90.5; 73/653, DIG. 1; 33/366, 391, DIG. 1, DIG. 21

[56] References Cited

U.S. PATENT DOCUMENTS

| | | | |
|---|---|---|---|
| 3,597,023 | 8/1971 | Baermann | 310/90.5 |
| 3,614,181 | 10/1971 | Meeks | 308/10 |
| 3,934,950 | 1/1976 | Kuhlmann | 310/90.5 |
| 4,152,940 | 5/1979 | Saito | 73/653 |
| 4,185,503 | 1/1980 | Saito | 73/653 |
| 4,684,811 | 8/1987 | deMey, II | 250/561 |
| 4,792,676 | 12/1988 | Hojo et al. | 250/231.6 Y |
| 4,821,218 | 4/1989 | Pötsch | 364/566 |

FOREIGN PATENT DOCUMENTS

412504 11/1966 Switzerland.

OTHER PUBLICATIONS

"Weinmann, Magnetic Bearings", manuscript (1976) 13 pages.

Primary Examiner—Steven L. Stephan
Assistant Examiner—D. R. Haszko
Attorney, Agent, or Firm—Nils H. Ljungman and Associates

[57] ABSTRACT

This invention relates to a self-aligning bearing for a precision measurement pendulum, in which, between the pendulum and a housing, there are two magnetic bearings, one each on either side of the pendulum, each of which has a bearing ring magnet. The magnetic bearing on the one side of the pendulum has a pole pivot for magnetic centering, opposite which is the pole pivot of a soft iron core. The magnetic bearing located on the other side of the pendulum has a spacer as a mechanical stop, in which there is a tension wire or band stretched between the pendulum and the housing. The magnetic bearings generate magnetic fields of like or unlike polarity extending in the direction of the pendulum axis of rotation, rotationally symmetrically around the latter, and magnetic fields of unlike polarity extending radially to the pendulum axis of rotation, and radially symmetrical to it. The precision measurement pendulum can be used advantageously in a highly-sensitive bearing for measurement purposes.

20 Claims, 3 Drawing Sheets

SELF-ALIGNING BEARING FOR A PRECISION MEASUREMENT PENDULUM

BACKGROUND OF THE INVENTION

1. Field of the Invention

This invention relates to a self-aligning bearing for a precision measurement pendulum.

2. Background Information

A precision measurement pendulum is used to measure the inclination or the vertical position of objects, whereby the angle of inclination can be very small, and the required precision of the inclination measurement very high.

A precision measurement pendulum can be used, among other things, to measure the axis of land vehicles, on which the position of the wheels in relation to one another and the vertical position of the wheels is determined by the deflection of a pendulum against a housing, which is connected to the wheels by means of an apparatus.

Such a precision measurement pendulum, for example, must allow deflections of ±11° around its own pendulum axis of rotation. It must also be possible to tip the pendulum by an angle of ±15° transverse to the axis, without adversely affecting the precision of the measurement. In many cases, a measurement precision of 20 seconds of an angle is required.

On account of the required high precision of the measurement, and the often unfavorable operating conditions, self-aligning bearings of the prior art cannot be used. Roller bearings are unsuitable, on account of the unevenness of the rolling friction, and a toe bearing cannot be used on account of possible impact loads, and the danger of contamination. Band or tape bearings develop memory effects after long use, if the mounting position differs from the working position.

OBJECT OF THE INVENTION

The object of the present invention is to create a self-aligning bearing for a precision measurement pendulum, which can be used to achieve highly accurate inclination measurements even under unfavorable operating conditions.

SUMMARY OF THE INVENTION

The solution according to the invention makes possible the manufacture of extremely small, rugged and economical bearings for a precision measurement pendulum which achieves high measurement precision when measuring inclination, even under unfavorable operating conditions.

The solution according to the invention uses a magnetic bearing, which is located between the pendulum and the housing of the precision measurement pendulum, on both sides of the pendulum oscillation plane. Each magnetic bearing is thereby designed so that in the axial direction, i.e. in the direction of the pendulum axis of rotation, attractive forces of unlike magnetic fields or repelling forces of like magnetic fields are generated. The bearing elements are thereby designed as bearing ring magnets, which make possible both an axial mounting and thus an axial fastening definition of the pendulum oscillation plane in relation to the housing, and also a radial centering of the pendulum in relation to the housing or in relation to a pendulum axis of rotation.

As a part of the magnetic bearing there are bearing ring magnets, while the end support or outboard bearing elements are formed by magnetic components or magnetically conducting components, so that an axial definition of the pendulum oscillation plane in relation to the housing becomes possible, along with a radial definition of the pendulum axis of rotation. The bearing ring magnets act together with the magnetic or magnetically conductive components so that the latter generate magnetic fields of like or unlike polarities in the direction of the pendulum axis of rotation, i.e. running rotationally-symmetrically around the pendulum axis of rotation and extending axially. The configuration of these magnetic fields is such that magnetic forces are generated between the bearing elements, in the axial direction, pointing toward the pendulum oscillation plane, or pointing away from it, so that the pendulum oscillation plane is defined or fixed in relation to the housing.

Because the configuration and orientation of the magnetic components or the components conducting the magnetic flux in relation to the bearing ring magnets generate unlike magnetic fields extending radially to the pendulum axis of rotation and radially symmetrically around it, the pendulum axis of rotation is clearly defined in relation to the housing.

In one advantageous configuration of the solution according to the invention, the bearing ring magnets are each connected to soft iron cores, which are used to hold the bearing ring magnets, and simultaneously influence the direction of the magnetic flux to optimize the magnetic bearing.

In an additional advantageous configuration of the invention, the degree of freedom of the pendulum is bounded or limited in the direction of the pendulum axis of rotation. In particular it is mechanically limited, so that additional stabilization is provided for the self-aligning bearing. As the stabilization means, preferably a tension band is located between the pendulum and the housing of the precision measurement pendulum, in the pendulum axis of rotation, and can optionally consist of a wire, a fiber, etc.

To reliably prevent unstable equilibrium positions of the pendulum oscillation plane in the housing, the magnetic bearings can be adjusted magnetically in the axial direction so that a tensile force is always exerted on the tension band. Such an adjustment can advantageously be achieved by varying the pole distances of the magnetic components in the magnetic bearing.

If components are used in the self-aligning bearing which conduct the magnetic flux, in particular soft iron cores, then these components are preferably configured so that there is a cylindrical, coaxial pole configuration. The axial cylindrical end pole surfaces are thereby opposite the end pole surfaces of the ring magnets, and at some distance from them, and coaxial poles extend coaxially to the ring magnets.

In one preferred embodiment, these soft iron cores are circular cylindrical shells, which are located coaxially in the pendulum axis of rotation and on whose end pole surfaces the end pole surfaces of the ring magnets are configured, with coaxial sharply contoured rings opposite and at some distance from one another. That means that when the self-aligning bearing is installed, the two sharply contoured rings of the circular cylindrical shells lie in a common cylindrical surface. With this configuration, locally concentrated magnetic fields are generated which run rotationally symmetrically around the pendulum axis of rotation, coaxially to one another, and thus optimize the definition in relation to the bearing ring magnets.

Coaxial pole pivots extend preferably coaxially from the bottoms of the circular cylindrical shells, so that they can optimally interact with the fields in the bearing ring magnets. This interaction of the pole pivots with the bearing ring magnets is further optimized by soft iron cores in the bearing ring magnets.

In one of the circular cylindrical shells, a spacer is advantageously used as the pole pivot, to which the tension band can be fastened.

If repelling forces are to be generated in the direction of the pendulum axis of rotation between the bearing elements, the invention specifies that the magnetic components should be designed as bar magnets oriented in the axis of rotation. The orientation and configuration of these bar magnets is thereby such that their radii are smaller than the inside radii of the rings of the bearing ring magnets. Because the orientation of the end pole surfaces of these bar magnets is at a small axial distance from the end pole surfaces of the bearing ring magnets, and because the polarities of the end pole surfaces of the bar and bearing ring magnets are identical, both an axial and a radial definition or fixing are achieved.

To make possible a compact construction of the precision measurement pendulum, the bar magnets are preferably designed as circular cylindrical discs. A simple structure is achieved, because the bearing ring and bar magnets are permanent magnets.

In the solution according to the invention, the magnetic bearing can advantageously be improved by a concentration of the magnetic flux by means of the soft iron cores. For this purpose, for example, the magnetic discs can be equipped with a ring with a bottom, and the ring can be equipped with a core, which also has a bottom. In this manner, a magnetic field is generated with field lines essentially in the toroidal direction with a relatively small air gap. The forces can thereby be increased, and significantly more approximate or greater tolerances achieved.

In an additional advantageous bearing configuration, the bearing ring magnets can be mounted in the stationary housing. The axial distance between the bearing elements, for example, can be several tenths of a millimeter. The poles of these bearing magnets then determine the axis of rotation of the pendulum.

Tipping forces do not occur in these magnetic bearings. Any impact loads which occur during operation are absorbed by the tension band. It has been shown that impact loads can be absorbed with low righting moments even with relatively short lengths of this tension band. Because of advances in the field of magnetic materials, it is possible to manufacture smaller, more rugged and more economical magnetic bearings, as disclosed in the literature, e.g. "Weinmann: Magnetic Bearings, Manuscript (1976)".

If the self-aligning bearing is installed in a housing, when the precision measurement device is being mounted, the tension band should be stretched in every position, so that no memory effects occur as a result of long-term bearing in a position different from the working position. This is advantageously achieved by the configuration of stops in the housing. These stops guarantee that when impacts occur, any radial deflection is possible only within the self-centering range.

To guarantee that when impacts occur—and impacts can occur in any direction—there can be no tipping, jamming or distortion of the pendulum body or band bearing, the configuration of the stops is selected so that in any position, the pendulum body abuts the housing at an angle which is always less than 80°.

This definition also applies for the band bearing. It also guarantees that the freedom of movement of the pendulum body in the direction of the band expansion is sufficient so that the pendulum body is initially captured laterally, before it can become jammed by the band tension. The spacer used also guarantees that when an impact occurs, the pole distances of the magnetic bearing remain intact, and thus the tension band remains in the tension direction.

BRIEF DESCRIPTION OF THE DRAWINGS

The theory behind the invention is explained below in greater detail, with reference to the embodiments illustrated in the accompanying drawings, which show.

DESCRIPTION OF THE PREFERRED EMBODIMENTS

Figure 1:
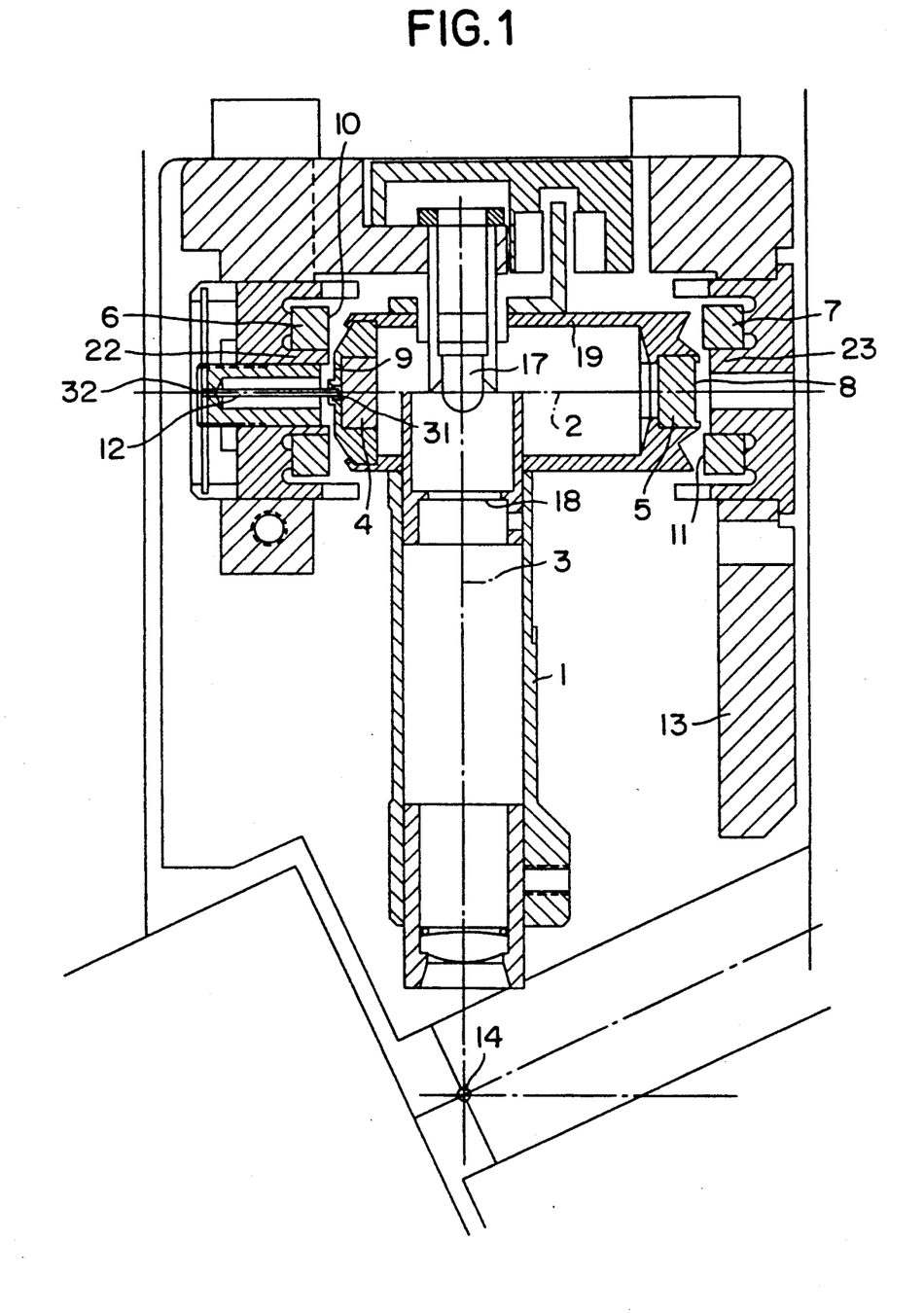
FIGS. 1 and 1a are schematic cross sections of a precision measurement pendulum installed in a measurement camera, with magnetic discs to mount the pendulum, and FIG. 2 a schematic cross section of the precision measurement pendulum with soft iron cores in the magnetic bearing.

The embodiment illustrated in FIG. 1 involves a measurement camera in which a precision measurement pendulum is located, the magnetic bearing of which is located in a housing 13 of the measurement camera. Inside this housing 13, a pendulum 1 is mounted in a pendulum oscillation plane 3 so that it can pivot around a pendulum axis of rotation 2. The rotational angle of the pendulum 1 around the pendulum axis of rotation 2 inside the pendulum oscillation plane is determined or measured by means of a CCD (charge coupled device) diode cell 14.

A luminous source 17 located within the pendulum 1 at the intersection of the pendulum axis of rotation 2 with an optical axis generates an image of a gap 18 on to the CCD diode cell 14. The luminous source 17 may be connected to the housing 13. This CCD diode cell 14 is cyclically read, and the position of the gap 18 is determined by a corresponding evaluation.

The magnetic bearing of the pendulum 1 illustrated in the drawing has a bearing sleeve 19. In the pendulum axis of rotation 2, there are magnetic discs 4, 5 located on the end pole surfaces of the bearing sleeve 19, on both sides of the pendulum 1. The magnetic discs 4, 5, which in this embodiment are permanent bar magnets, lie with their poles in the center of the pendulum axis of rotation 2.

Fastened to the housing 13 are soft iron cores 22, 23, with which ring magnets 6, 7 are connected, which are mounted so that their poles lie in the pendulum axis of rotation 2. The soft iron cores 22, 23, in addition to holding the ring magnets 6, 7, are also used to orient the magnetic flux of the magnetic bearing.

The pendulum-side end pole surfaces 10, 11 of the ring magnets 6, 7 are located some axial distance from the housing-side end pole surfaces 8, 9 of the magnetic discs 4, 5. The end pole surfaces 8 and 11 and 10 and 9 opposite one another of the magnetic components of the magnetic bearing have the same polarity. As a result of the geometric configuration and the polarity of the magnets, the magnetic discs 4 and 5 are simultaneously radially centered and axially supported. That is, the magnetic discs 4, 5 are simultaneously repelled by the ring magnets 6 and 7 respectively, thus simultaneously centering and supporting the pendulum.

Figure 1A:
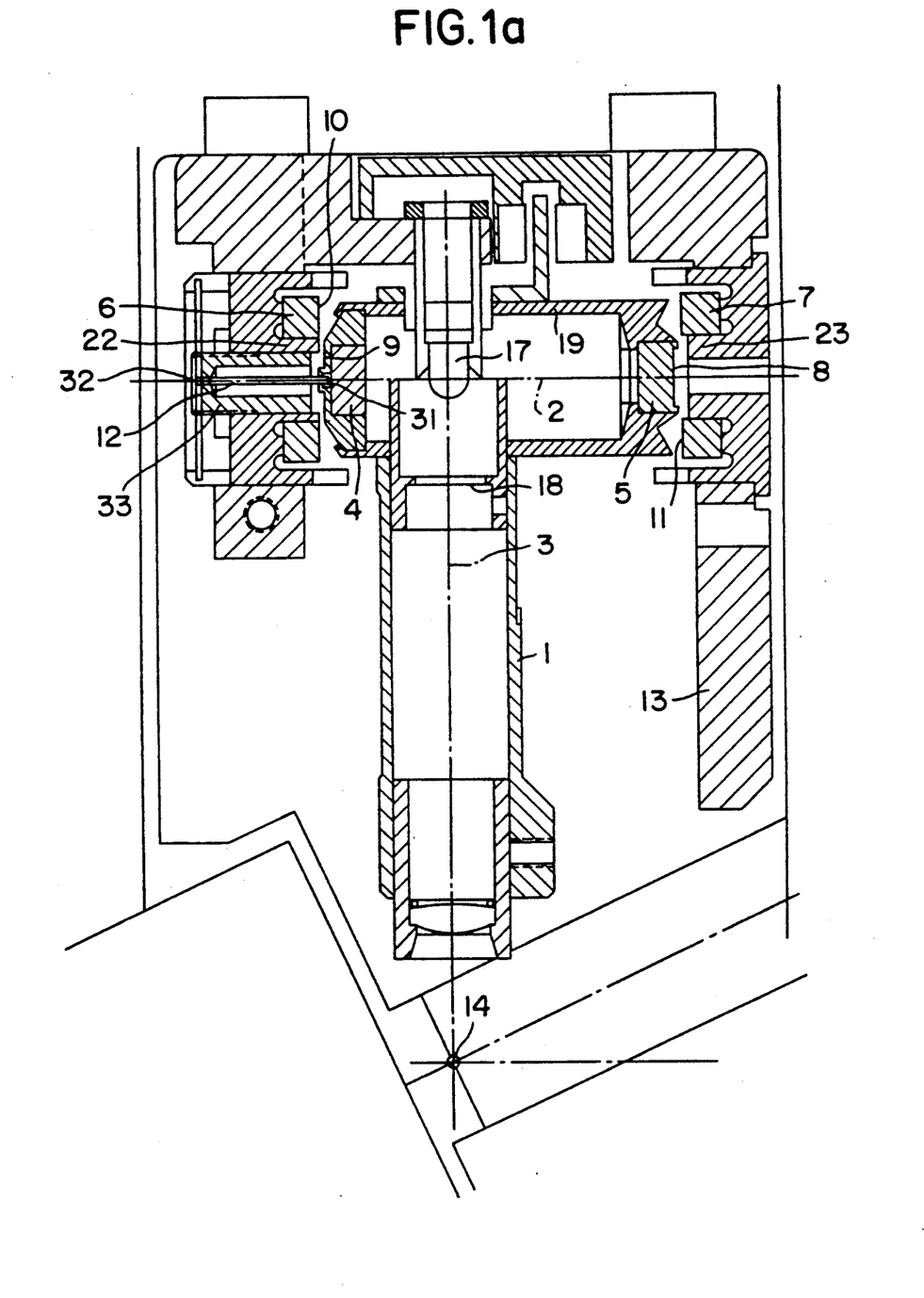

Under certain operating conditions, the magnetic bearing described above has an axial degree of freedom which, in the embodiment illustrated in FIG. 1, is defined by a tension band 12, which is fastened in a pendulum-side clamping apparatus 31 and a housing-side clamping apparatus 32 on the one side of the pendulum 1. For this purpose, a sleeve 33 (shown in FIG. 1a) is inserted in the soft iron core 22, and on its housing-side end surface supports the housing-side clamping apparatus 32 to stretch or fasten the tension band 12.

Figure 2:
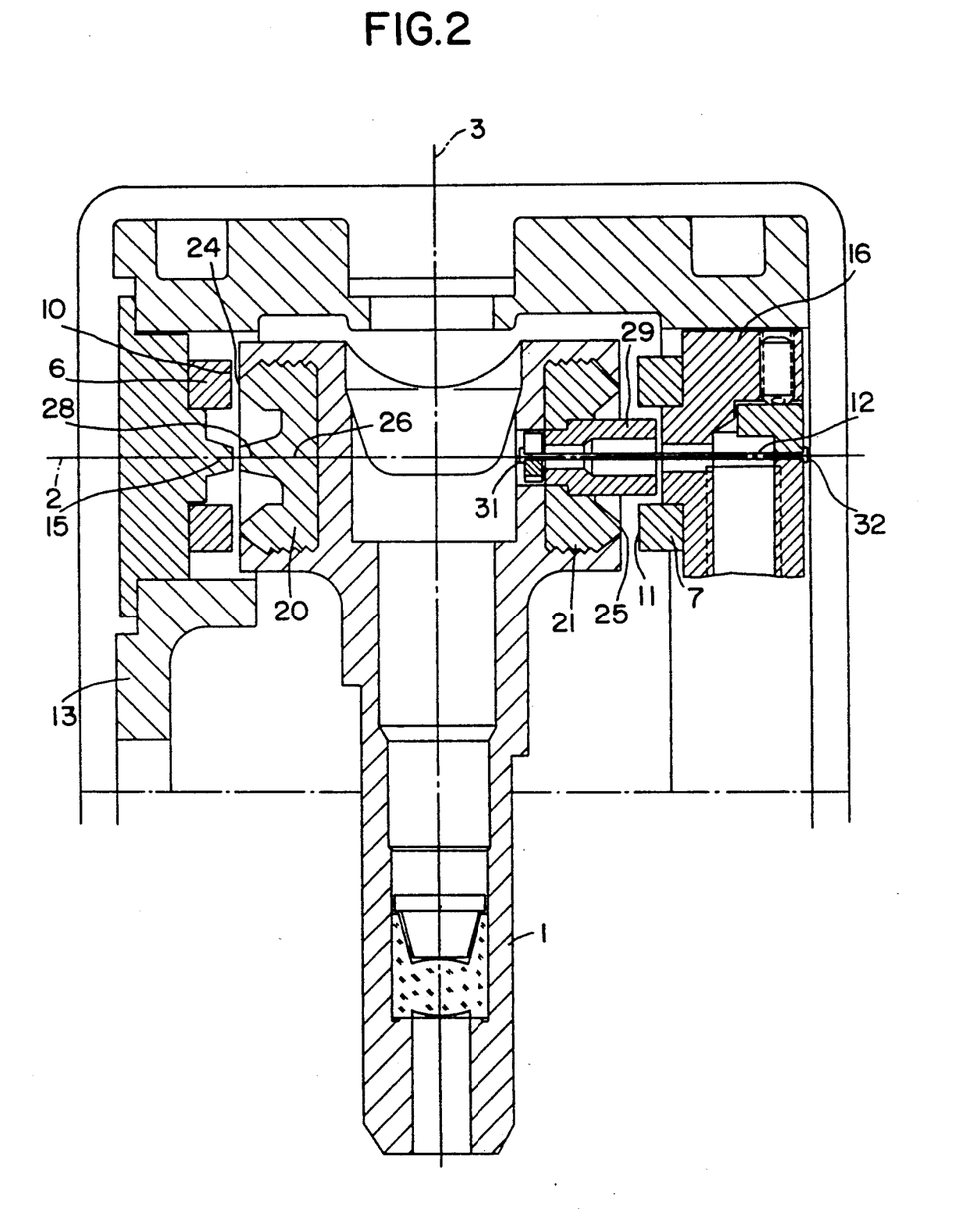

FIG. 2 shows a precision measurement pendulum in which, for the supplemental magnetic centering of the magnetic bearing, there are pole pivots on one side of the pendulum 1 and a spacer 29 on the other side of the pendulum 1, which exerts no magnetic centering function, but acts as a mechanical stop for the centering.

The pendulum 1 is connected to circular cylindrical shells 20, 21, which consist of soft iron cores. The axes of the soft iron cores 20, 21 lie in the pendulum axis of rotation 2. The housing-side end pole surfaces of the soft iron cores 20, 21 form soft iron poles which are opposite the pendulum-side end pole surfaces 10, 11 of bearing ring magnets 6, 7. These bearing ring magnets 6, 7 are connected to soft iron cores 15, 16, which correspond to the soft iron cores 22, 23 of the embodiment illustrated in FIG. 1.

On the end surfaces of the circular cylindrical shells or soft iron cores 20, 21 there are sharply contoured rings 24, 25, which lie on a cylindrical surface oriented coaxially around the pendulum axis of rotation 2.

For additional centering, extending from the bottom 26 of the circular cylindrical shell 20 is a pole pivot 28, which runs coaxially toward the bearing ring magnet 6, up to the plane of the sharply contoured ring 24. Opposite the pole pivot 28 is a pivot segment of the soft iron core 15 of the ring magnet 6.

Opposite the additional magnetic centering by the pole pivot 28, on the other side of the pendulum 1, there is a spacer 29 which has no magnetic centering function, but forms a mechanical stop. This spacer 29 is inserted into the circular cylindrical shell 21, and extends toward the pendulum-side end surface of the soft iron core 16, which is connected to the housing 13 on this side of the pendulum 1.

The tension band 12 also located on this side of the pendulum 1 is stretched between a pendulum-side clamping apparatus 31 which is connected to the spacer 29, and a housing-side clamping apparatus 32. To apply tension to the tension band 12 in this embodiment, the pole distance between the circular cylindrical shell 21 and the bearing ring magnet 7 is greater than the pole distance between the circular cylindrical shell 20 and the bearing ring magnet 6 on the other side of the pendulum 1.

The order in which the embodiments of the invention are described above is not intended in any way to assign any priority to these embodiments. The embodiment illustrated in FIG. 2 will find a wider range of uses than the embodiment illustrated in FIG. 1, on account of its simpler construction and the possibility of an additional magnetic centering by means of a pole pivot on the one side of the pendulum and a mechanical stop for centering on the other side of the pendulum.

One aspect of the invention resides broadly in a self-aligning bearing for a precision measurement pendulum, characterized by two magnetic bearings 4 to 7; 6, 7, 20, 21 located between a pendulum 1 and a housing 13, one each on either side of a pendulum oscillation plane 3, which bearings have a bearing ring magnet 6, 7 and a magnetic component 4, 5, 20, 21 or one conducting the magnetic flux, and characterized by the fact that this component generates magnetic fields of like or unlike polarity extending in the direction of the pendulum axis of rotation 2 and rotationally symmetrical to it, and magnetic fields of unlike polarity extending radially to the pendulum axis of rotation 2, radially symmetrically around it.

Another aspect of the invention is a self-aligning bearing characterized by the fact that the bearing ring magnets 6, 7 are connected to a soft iron core 22, 23; 15, 16.

Yet another aspect of the invention is a self-aligning bearing characterized by the fact that the degree of freedom of the self-aligning bearing is mechanically limited in the direction of the pendulum axis of rotation 2.

A further aspect of the invention is a self-aligning bearing characterized by the fact that there is a tension band 12 located between the pendulum 1 and the housing 13 in the pendulum axis of rotation 2.

A yet further aspect of the invention is a self-aligning bearing characterized by the fact that the magnetic bearings 4 to 7; 6, 7, 20, 21 can be magnetically adjusted in the axial direction so that a tensile force is exerted on the tension band 12.

Yet another further aspect of the invention is a self-aligning bearing characterized by the fact that the magnetic bearing, on both sides of the pendulum 1, has soft iron components with a circular cylindrical-coaxial pole configuration, the end pole surfaces of which are opposite to and at some distance from the pendulum-side end pole surfaces 10, 11 of the ring magnets 6, 7.

An additional aspect of the invention is a self-aligning bearing characterized by the fact that the soft iron components are circular cylindrical shells 20, 21 oriented coaxially in the pendulum axis of rotation 2, and on their end surfaces, opposite and at some distance from the pendulum-side end surface poles 10, 11 of the ring magnets 6, 7, there are sharply contoured rings 24, 25 coaxial to one another.

A yet additional aspect of the invention is a self-aligning bearing characterized by the fact that at least on one bottom 26, 27 of the soft iron components 20, 21, coaxial pole pivots 28 extend toward opposite, pendulum-side pole pivots of soft iron cores 15.

A further additional aspect of the invention is a self-aligning bearing characterized by the fact that in one of the two circular cylindrical shells 21, the pole pivot consists of a spacer 29 for the tension band 12 inserted in the cylindrical shell 21, which tension band 12 is stretched between a pendulum-side clamping apparatus 31 and a housing-side clamping apparatus 32.

A yet further additional aspect of the invention is a self-aligning bearing characterized by the fact that the magnetic components are bar magnets 4, 5 oriented in the pendulum axis of rotation 2 and that the radii of these bar magnets are smaller than the inside radii of the rings of the bearing ring magnets 6, 7, and their housing-side end pole surfaces 8, 9 are located at an axial distance from the pendulum-side end surfaces 10, 11 of the bearing ring magnets 6, 7, and that the polarities of the pendulum-side and housing-side end surfaces 8, 9; 10, 11 of the bar magnets 4, 5 and bearing ring magnets 6, 7 are identical.

Another further additional aspect of the invention is a self-aligning bearing characterized by the fact that the bar magnets 4, 5 are designed as circular discs.

A yet another additional aspect of the invention is a self-aligning bearing characterized by the fact that the bearing ring magnets and bar magnets 4, 5; 6, 7 are permanent magnets.

Another yet further aspect of the invention is a self-aligning bearing characterized by the fact that the ring magnets 6, 7 are mounted stationary in the housing 13 of the precision measurement pendulum.

A still further aspect of the invention is a self-aligning bearing for a precision measurement pendulum installed in a measurement housing, characterized by the fact that there are stops for the pendulum 1 in the housing 13, so that in any position, the pendulum 1 abuts or borders the housing 13 at an angle which is less than 80°.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. Apparatus for precisely measuring deviation from a reference vertical position, said apparatus comprising:
   a housing;
   a precision pendulum arrangement within said housing for determining deviations from the reference vertical position;
   said precision pendulum arrangement comprising:
      elongated pendulum means for oscillating in a pendulum oscillation plane;
      said pendulum means having a pendulum axis of rotation; and
      said pendulum axis of rotation being substantially horizontal;
   two self-aligning magnetic bearings to support said elongated pendulum means, each of said two magnetic bearings being located between said elongated pendulum means and said housing;
   one of each of said two magnetic bearings being on opposite sides of said pendulum oscillation plane;
   each of said two magnetic bearings comprising:
      a bearing ring magnet; and
      a magnetic component, configured for directing magnetic fields extending in the direction of the pendulum axis of rotation and rotationally symmetrical to the pendulum axis of rotation, and magnetic fields of unlike direction extending radially to the pendulum axis of rotation, radially symmetrically around the pendulum axis of rotation; and
   optical sensor means for sensing the position of the pendulum arrangement relative to the housing.

2. Apparatus according to claim 1, comprising:
   at least one soft iron core, wherein said bearing ring magnet is connected to at least one of said soft iron cores; and
   said optical sensor means comprises:
      a luminous source located within said elongated pendulum means; and
      light detection means for detecting the position of said elongated pendulum means from said reference vertical position.

3. Apparatus according to claim 2, comprising:
   means for mechanically limiting the degree of freedom of said two magnetic bearings in the direction of the pendulum axis of rotation.

4. Apparatus according to claim 1, comprising:
   means for mechanically limiting the degree of freedom of said two magnetic bearings in the direction of the pendulum axis of rotation.

5. Apparatus according to claim 3, wherein said means for mechanically limiting the degree of freedom comprises a tension band connected between the pendulum arrangement and the housing, said tension band being located in the pendulum axis of rotation.

6. Apparatus according to claim 1, comprising:
   a tension band connected between the pendulum arrangement, said tension band being located in the pendulum axis of rotation.

7. Apparatus according to claim 2, comprising:
   a tension band connected between the pendulum arrangement, said tension band being located in the pendulum axis of rotation.

8. Apparatus according to claim 5, wherein said two magnetic bearings are configured so that a tensile force is exerted on the tension band.

9. Apparatus according to claim 8, wherein:
   said two bearing ring magnets are mounted on said housing;
   said two magnetic components are mounted on said precision pendulum arrangement; and
   said two magnetic components comprise soft iron components with a circular cylindrical-coaxial pole configuration having end pole surfaces, which end pole surfaces are opposite to and at some distance from the ring magnets.

10. Apparatus according to claim 9, wherein:
    said end pole surfaces of said soft iron components comprise coaxial pole pivots which are coaxial with said pendulum axis of rotation, which pole pivots extend toward said soft iron cores of said ring magnets, and
    said soft iron cores of said ring magnets comprise coaxial pole pivots which are coaxial with said pendulum axis of rotation, which pole pivots extend towards said magnetic components.

11. Apparatus according to claim 9, wherein the soft iron components are circular shells oriented coaxially in the pendulum axis of rotation, and on their end pole surfaces there are sharply contoured rings coaxial to one another, said sharply contoured rings have a portion which converges towards said housing.

12. Apparatus according to claim 11, wherein:

one of the two circular cylindrical shells comprises a pole pivot;

the pole pivot consists of a spacer for the tension band, which spacer is inserted in the cylindrical shell, and which spacer is configured to function as a mechanical stop to limit axial movement of said pendulum arrangement;

said apparatus for measuring deviation comprises a clamping apparatus configured to hold said tension band between said housing and said pendulum arrangement; and said light detection means comprises a charge coupled device diode cell.

13. Apparatus according to claim 11, wherein:

said end pole surfaces of said soft iron components comprise coaxial pole pivots which are coaxial with said pendulum axis of rotation, which pole pivots extend toward said soft iron cores of said ring magnets, and said soft iron cores of said ring magnets comprise coaxial pole pivots which are coaxial with said pendulum axis of rotation, which pole pivots extend towards said magnetic components.

14. Apparatus according to claim 8, wherein:

the magnetic components are mounted on the pendulum arrangement;

the magnetic components are cylinders and have radii;

the bearing ring magnets are mounted on the housing;

the bearing ring magnets have internal radii;

the magnetic components comprise bar magnets oriented in the pendulum axis of rotation and the radii of these bar magnets are smaller than the inside radii of the ring magnets;

the magnetic components are located at an axial distance from the bearing ring magnets; and the polarities of the bar magnets and bearing ring magnets are identical.

15. Apparatus according to claim 14, wherein the bar magnets are designed as circular discs.

16. Apparatus according to claim 15, wherein the bearing ring magnets and bar magnets are permanent magnets.

17. Apparatus according to claim 16, wherein:

there are stops for the pendulum arrangement in the housing, so that in any position, the pendulum arrangement abuts or borders the housing at an angle which is less than 80°; and said light detection means comprises a charge coupled device diode cell.

18. Self-aligning bearing for a precision measurement pendulum having a housing and an elongated pendulum means for oscillating in a pendulum oscillation plane, which elongated pendulum means having a pendulum axis of rotation, said self-aligning bearing comprising:

two magnetic bearings, each of said two magnetic bearings being located between said elongated pendulum means and said housing;

one of each of said two magnetic bearings being on opposite sides of the pendulum oscillation plane;

each of said two magnetic bearings comprising:

a bearing ring magnet, and a magnetic component configured for directing magnetic fields extending in the direction of the pendulum axis of rotation and rotationally symmetrical to the pendulum axis of rotation, and magnetic fields of unlike direction extending radially to the pendulum axis of rotation, radially symmetrically around the pendulum axis of rotation; and a soft iron core, wherein said bearing ring magnet is connected to said soft iron core; and means for mechanically limiting the degree of freedom of said two magnetic bearings in the direction of the pendulum axis of rotation;

said means for mechanically limiting the degree of freedom comprises a tension band connected between the pendulum arrangement and the housing, said tension band being located in the pendulum axis of rotation;

said two magnetic bearings are configured so that a tensile force is exerted on the tension band;

said two bearing ring magnets are mounted on one of said housing and said pendulum means;

said two magnetic components are mounted on the other of said housing and said pendulum means;

said two magnetic components comprise soft iron components with a circular cylindrical-coaxial pole configuration having end pole surfaces, which end pole surfaces are opposite to and at some distance from the ring magnets; and the soft iron components are circular cylindrical shells oriented coaxially in the pendulum axis of rotation, and on their end pole surfaces there are sharply contoured rings coaxial to one another, said sharply contoured rings have a portion which converges towards said bearing ring magnets.

19. Self-aligning bearing according to claim 18, wherein:

said end pole surfaces of said soft iron components comprise coaxial pole pivots which are coaxial with said pendulum axis of rotation, which pole pivots extend toward said soft iron cores of said ring magnets, and said soft iron cores of said ring magnets comprise coaxial pole pivots which are coaxial with said pendulum axis of rotation, which pole pivots extend towards said magnetic components.

20. Self-aligning bearing for a precision measurement pendulum having a housing and an elongated pendulum means for oscillating in a pendulum oscillation plane, which elongated pendulum means having a pendulum axis of rotation, said self-aligning bearing comprising:

two magnetic bearings, each of said two magnetic bearings being located between said elongated pendulum means and said housing;

one of each of said two magnetic bearings being on opposite sides of the pendulum oscillation plane;

each of said two magnetic bearings comprising:

a bearing ring magnet, and a magnetic component configured for directing magnetic fields extending in the direction of the pendulum axis of rotation and rotationally symmetrical to the pendulum axis of rotation, and magnetic fields of unlike direction extending radially to the pendulum axis of rotation, radially symmetrically around the pendulum axis of rotation; and a soft iron core, wherein said bearing ring magnet is connected to said soft iron core; and means for mechanically limiting the degree of freedom of said two magnetic bearings in the direction of the pendulum axis of rotation;

said means for mechanically limiting the degree of freedom comprises a tension band connected between the pendulum arrangement and the housing, said tension band being located in the pendulum axis of rotation;

said two magnetic bearings are configured so that a tensile force is exerted on the tension band;

the magnetic components are mounted on one of the pendulum means and the housing;

the bearing ring magnets are mounted on the other of the pendulum means and the housing;

the magnetic components are cylinders and have radii;

the bearing ring magnets have internal radii;

the magnetic components comprise bar magnets oriented in the pendulum axis of rotation and the radii of these bar magnets are smaller than the inside radii of the bearing ring magnets;

the magnetic components are located at an axial distance from the bearing ring magnets; and the polarities of the bar magnets and bearing rings magnets are identical.

* * * * *

UNITED STATES PATENT AND TRADEMARK OFFICE
CERTIFICATE OF CORRECTION

PATENT NO. : 5,191,249
DATED : March 2, 1993
INVENTOR(S) : Erich Rauscher, Hans Dieter Jacoby and Karel SRB It is certified that error appears in the above-indentified patent and that said Letters Patent is hereby corrected as shown below:

On the Title Page, item 73, after "Arnold &", delete "Richier" and insert --Richter--.

Signed and Sealed this

Second Day of August, 1994

*Attest:*

BRUCE LEHMAN

*Attesting Officer*       *Commissioner of Patents and Trademarks*